May 8, 1934. T. NAGEL 1,958,201
CARBURETING PROCESS
Filed June 6, 1932 3 Sheets-Sheet 2

INVENTOR.
Theodore Nagel
BY
Kiddle Margeson and Harridge
ATTORNEYS.

May 8, 1934. T. NAGEL 1,958,201
CARBURETING PROCESS
Filed June 6, 1932 3 Sheets-Sheet 3

INVENTOR.
Theodore Nagel.
BY
Kiddl, Marquis and Harris
ATTORNEYS.

Patented May 8, 1934

1,958,201

UNITED STATES PATENT OFFICE 1,958,201

CARBURETING PROCESS

Theodore Nagel, Brooklyn, N. Y., assignor to Carburetted Gas, Inc., a corporation of Delaware Application June 6, 1932, Serial No. 615,575

5 Claims. (Cl. 48—213)

The present invention is directed to a continuous flow process, as contradistinguished to intermittent or cyclic processes, for producing a carbon monoxide, hydrogen, hydrocarbons gas mixture.

In my copending application Serial No. 576,613, filed November 21, 1931, I presented a process for the continuous production or continuous flow production of carbureted blue gas, known commercially as approximately 550 B. t. u. per cubic foot gas, the usual standard for public utility gas, and the present application provides apparatus suitable for the production of such a gas.

Following the introduction into large communities of natural gas which has a heating value around 1000 B. t. u. per cubic foot the quality of public utility gas has been raised to around 800 B. t. u. per cubic foot, this 800 B. t. u. gas being a mixture of carbureted water gas, coke oven gas, reformed oil gas and natural gas. Some of the processes involved in the production of this 800 B. t. u. gas are intermittent, and present, of course, the disadvantages inherent in all intermittent gas making processes by way of expensive equipment, of the nature of brick checker work, loss of gas production capacity during the necessary heating periods of the intermittent operation, large gas holders for storage, etc. The present invention provides for the production of carbureted carbon monoxide hydrogen gas of approximately any commercial B. t. u. heating value from fuel oil in a continuous process and in particular to the production of 850 B. t. u. per cubic foot carbureted carbon monoxide hydrogen gas, whereby the disadvantages incident to the mentioned intermittent prior processes are overcome.

Figure 1:
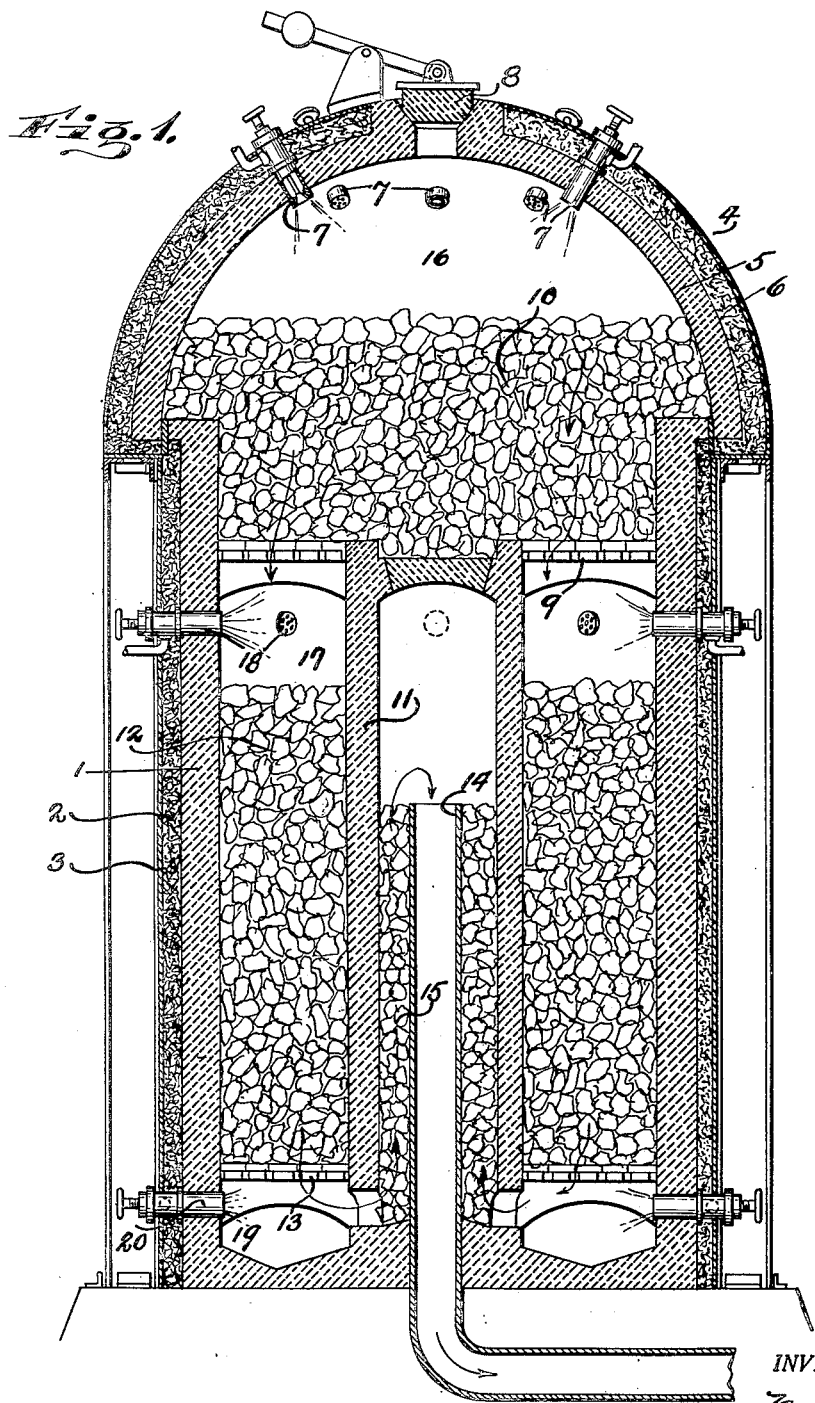
Fig. 1 shows in sectional elevation an apparatus constituting one embodiment of my invention.

Referring to the drawings in detail and first of all to Fig. 1, it will be seen that in this embodiment of my invention I provide a vertically extending gas making chamber lined with refractories 1 and heat insulated with magnesia-asbestos 2 or other suitable heat insulating material, many types of which are available in the open market. The outer casing of the structure is of steel 3.

The upper part of the generating set provides a dome 4, lined with refractories 5 and heat insulated as shown at 6.

The gas making materials for the exothermic reaction constituting the first step of my continuous process, and in which step I produce carbon monoxide hydrogen gas from oil and oxygen, are injected or introduced continuously in properly regulated proportions, into the chamber provided by the dome 4, through suitable nozzles 7. At this point I wish to note that by the term "oxygen" I mean commercially pure oxygen, or oxygenated air, as the case may be. The dome 4 is provided with relief valve 8, more or less diagrammatically illustrated in the drawings. Just sufficient oxygen is introduced to satisfy the carbon of the oil to carbon monoxide, and when commercially pure oxygen is employed the carbon monoxide hydrogen gas generated by the partial combustion of the oil and oxygen, an exothermic reaction, is at a maximum temperature of around 3000° F. Of course if oxygenated air is employed this temperature is lower due to heating up the nitrogen dilution. In any event if the resulting temperatures are considered too high, that is, above the temperatures usually employed in gas making operations, I propose additionally to introduce oil and steam continuously into the chamber provided by the dome 4, in proper proportions for converting the oil and steam, by the resulting endothermic reaction, to carbon monoxide and hydrogen.

Below the bottom of the dome 4 I provide a perforate floor structure 9 of any suitable type, the essentials being a floor of the necessary strength for supporting a carbonaceous contact material 10, and at the same time a floor which will be sufficiently perforate to permit of the downward flow of the gas reaction products from the dome chamber 16. Refractories laid as shown are satisfactory.

As so far described, therefore, my invention provides a vertical generator having a dome-shaped reaction chamber at the top thereof, equipped with the necessary apparatus for the continuous introduction of oil and oxygen and if found necessary or desirable, some oil and steam, the chamber being partially filled with a bed of contact material such as solid carbon, coke for example, with which the gases formed by the reaction of the oil and oxygen in the dome chamber contact as they descend. The contact material 10 assures the presence at all times of excess carbon during the desired reaction and also acts as a mixer of the gas making materials as they flow downward around the contact material to insure the desired chemical reactions.

Extending upwardly from the bottom of the generating set, centrally thereof, is a hollow refractory column 11 affording a partial support for the floor structure 9, this column being spaced from the outer wall of the generator and providing a vertically extending annular chamber 17.

This annular chamber 17 is partially filled with contact material 12, which may be similar to the material 10 above referred to, the material resting on a perforate floor 13.

Extending upwardly within the hollow column 11 is a discharge pipe or gas outlet 14, smaller in diameter than the inner chamber of the column so as to provide a vertically extending annular chamber within the hollow column between the pipe or conduit and the inner wall of the column. This chamber contains contact material 15 such as coarse refractory.

The contact material 12 terminates short of the top of the annular chamber 17 surrounding the column 11 so as to provide a space adjacent the top of the annular chamber 17 above the material 12 for the reception of the additional gas making materials above referred to, such as steam and oil, which are injected into this chamber through nozzles 18 provided for that purpose.

By introducing oil and steam into the carbon monoxide hydrogen gas which may be, as above pointed out, at a temperature of 3000° F., I obtain an endothermic reaction, which not only generates additional carbon monoxide hydrogen gas, in other words, increases the volume of gas produced, but also lowers the temperature of the carbon monoxide hydrogen gas to a temperature range between 1150° F. and 1650° F. for example in which temperature range the maximum yield of fixed hydrocarbon gas is obtained from hydrocarbons. It will be appreciated that the contact material 12 has a controlling function, in that the same insures uniform temperature distribution and a thorough mixing of the gas making materials passing therethrough.

Up to this point, therefore, I have provided for a continuous flow process for the continuous production of a carbon monoxide hydrogen gas employing the excess heat generated in the exothermic reaction of oil with oxygen for the endothermic production of additional carbon monoxide hydrogen gas, at the same time lowering the temperature of the carbon monoxide hydrogen gas to a temperature range in which the maximum yield of fixed hydrocarbon gas is obtained from oil gas.

As the carbon monoxide hydrogen gas passes continuously to the chamber provided by the space between the discharge pipe 14 and the inner wall of the column 11 hydrocarbons enrichment is injected thereinto through nozzles 20 located in chamber 17 at the base of the contact material 12, the enriched gas then passing through the base of the column and upwardly or counterflow through the contact material 15 before finally entering the gas outlet 14, absorbing heat conducted through the wall of the column 11 from the relatively hotter uncarbureted gas flowing downwardly through the chamber 17, the contact material 15 providing for gas mixing and uniform heat distribution so as to permit the hydrocarbons enrichment to be converted into a fixed gas before the carbureted carbon monoxide hydrogen gas is finally discharged from the generator, it being appreciated, as above noted, that I have so controlled my carbon monoxide hydrogen gas temperature that maximum enrichment is produced. It is to be understood also that the volume of the enrichment material which is continuously introduced into the carbon monoxide hydrogen gas through nozzles 20 is so regulated with respect to the volume of the carbon monoxide hydrogen gas flowing through chamber 19 as to bring the heating value of the resultant enriched or carbureted carbon monoxide hydrogen gas to the desired value, for example the 550 B. t. u. gas of my copending application or the 850 B. t. u. gas above referred to, or any intermediate heating value between approximately 550 B. t. u. and approximately 1000 B. t. u. per cubic foot.

Figure 2:
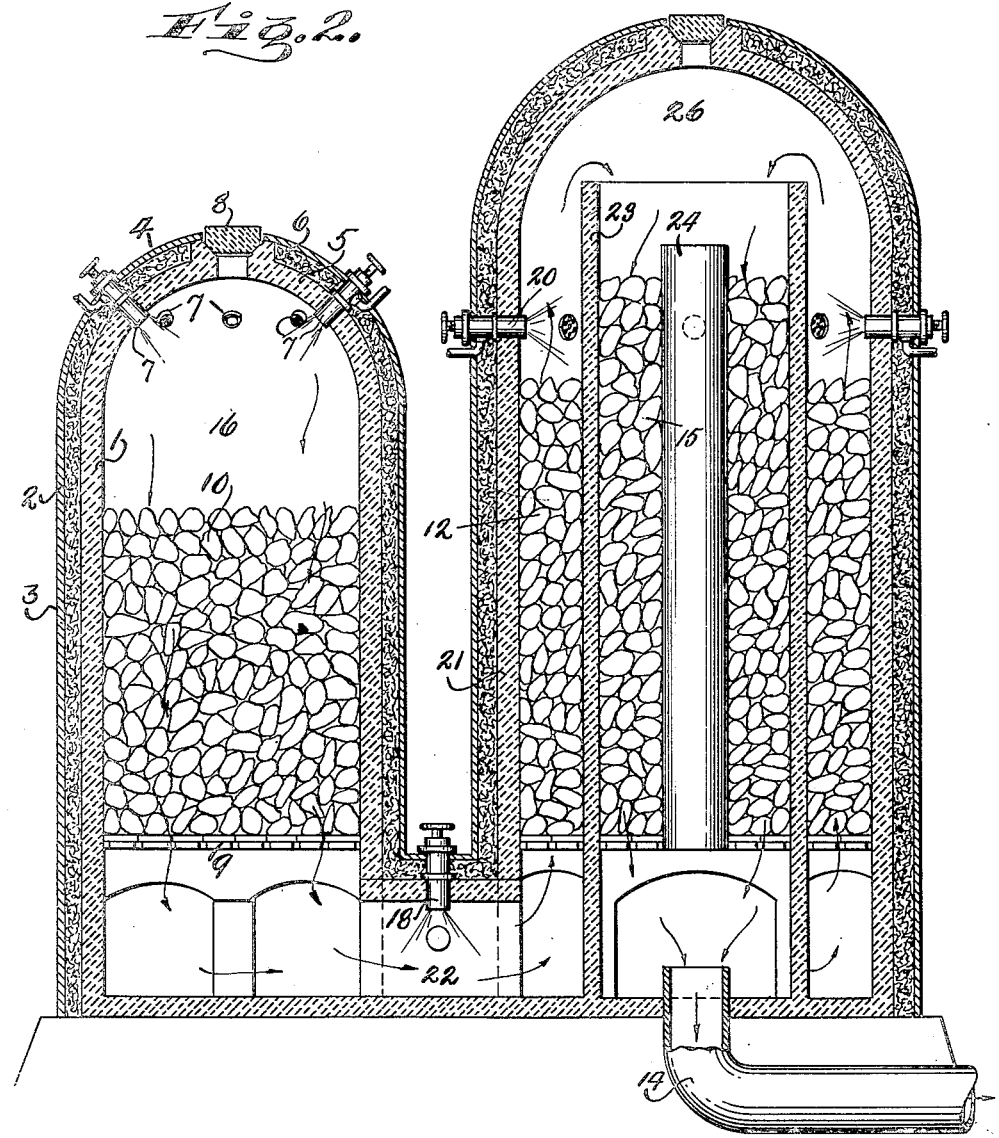
Fig. 2 is a sectional elevation of a modification.

In the modified embodiment of my invention as illustrated in Fig. 2 I employ, as before, a vertically extending gas generating chamber lined with refractories 1 and heat insulated with magnesia-asbestos 2 or other suitable heat insulating material. The outer casing 3 is of steel. The upper dome shaped part of the generator is lined with refractories 5 and heat insulated as shown at 6. Suitable nozzles 7 provide for the continuous injection into the chamber provided by the dome 4 of the gas making materials such as oil and oxygen to produce exothermally a carbon monoxide hydrogen gas at around 3000° F. the temperature of which as above explained may be lowered by the injection of additional oil and steam.

The floor structure 9, which corresponds to the floor structure 9 of Fig. 1, supports carbonaceous contact material 10.

Adjacent the vertical carbon monoxide hydrogen gas generator just described and communicating therewith I provide a vertically extending chamber 26 lined with refractories 21, communication with the gas generator being maintained by way of channel or passageway 22. Extending vertically and centrally located within chamber 26 is a refractory column 23 spaced from the refractory wall 21 to provide an annular chamber partially filled with contact material 12. Extending centrally of the column 23 is a hollow column 24 closed at the top and open at the bottom, the annular chamber provided between this column 24 and the column 23 being partially filled with contact material 15, similar to the refractory material 15 of Fig. 1.

In the operation of this apparatus the carbon monoxide hydrogen gas continuously generated exothermally in the chamber 16 by the reaction of oil with oxygen (the temperature being lowered if desired by the introduction of additional oil and steam for endothermic reaction) passes downwardly through the contact material 10 and the floor 9 and into the passageway or chamber 22, the reaction control contact material 10 insuring the presence of excess carbon, and also causing a mixing action of the gas making materials and uniform heat distribution to insure the desired reactions up to where oil and steam are injected through nozzles 18 for endothermic reaction, to reduce the temperature of the carbon monoxide hydrogen gas preparatory to the addition of the hydrocarbons enrichment, this endothermic reaction as will be understood increasing the carbon monoxide hydrogen gas volume, the gas then passing upwardly through the contact material 12 to the unobstructed carbureting chamber provided between the top of contact materials 12 and 15. As the carbon monoxide hydrogen gas flows past the nozzles 20 located in the upper part of the vertical chamber hydrocarbons enrichment is added, in the form of oil, or oil gas, for example, the temperature of the carbon monoxide hydrogen gas on the introduction of the hydrocarbons enrichment having been lowered but not below the temperature range of 1150° F. to 1650° F. permitted for maximum yield of fixed hydrocarbon gas from oil gas for example. Hydrocarbon vapors are converted to fixed hydrocarbon gas by heat, an endothermic cooling reaction. The addition of the hydrocarbons enrichment to the carbon monoxide hydrogen gas will effect a further cooling of the gas as will be understood, and consequently, in this embodiment of my invention, in order that I may obtain the maximum fixed hydrocarbon gas in my carbureted carbon monoxide hydrogen gas, I cause the enriched gas to pass downward through the annular chamber on the inside of the column 23, absorbing heat conducted through the column wall 23 from the continuously upwardly flowing relatively hotter uncarbureted carbon monoxide hydrogen gas passing upwardly through contact material 12 to the carbureting nozzles 20 and during this downward flow through contact material 15 before flowing into the gas outlet 14 the carbureted carbon monoxide hydrogen gas is heated (known as superheating in carbureted water gas operation) to the desired temperature within the temperature range of 1150° F. to 1650° F. as cited above. Thus it will be seen that heat required for enriching purposes is supplied by the sensible heat of the leaner gas. The volume of enrichment material introduced through nozzles 20, as will be appreciated, is regulated so as to give a resultant carbureted carbon monoxide hydrogen gas of the desired B. t. u. heating value.

Figure 3:
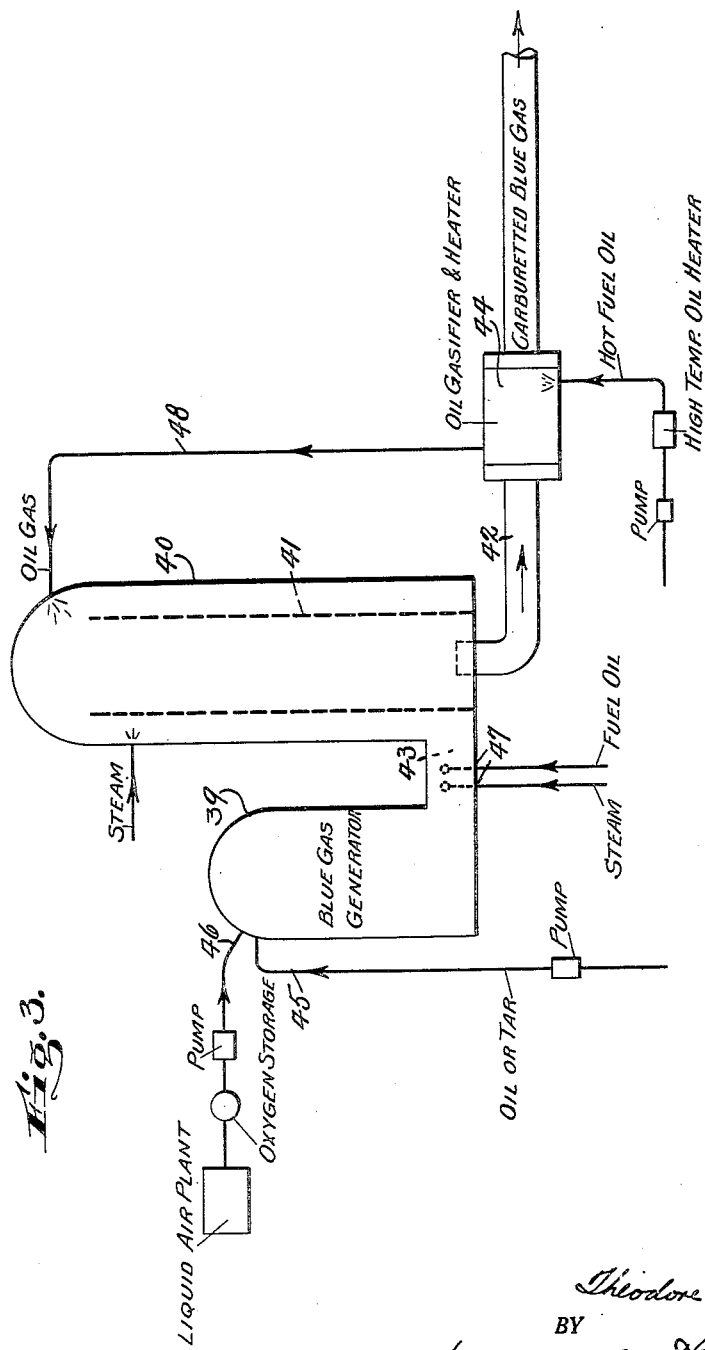
Fig. 3 is a flow diagram of another embodiment of my invention.

Referring to the embodiment of my invention as illustrated in Fig. 3, 39 designates a carbon monoxide hydrogen gas generator which may be of the same type as the gas generator of Fig. 2, while 40 designates a gas carbureter which in its interior is primarily provided with a refractory pier 41, the gas generator and the carbureter being connected by passageway 43 corresponding to the passageway 22 of Fig. 2.

The discharge pipe 42 from the carbureter passes to a fuel oil gasifier of standard construction designated 44.

Oil and oxygen are continuously injected into the upper part of the gas generating set 39 through pipes and nozzles 45 and 46, the oil and oxygen as will be understood being taken from any suitable source of supply.

The carbon monoxide hydrogen gas generated exothermally in the generator 39 passes downwardly through the generator and through passageway 43 to the carbureter 40, the desired temperature control being obtained by introducing oil and steam into the gas through nozzles 47, the introduction of these materials not only lowering the temperature of the gas but producing additional carbon monoxide hydrogen gas endothermally as will be understood.

The carbon monoxide hydrogen gas thus generated passes upwardly through the carbureter 40, and before it enters the discharge pipe 42 hydrocarbons enrichment is injected thereinto. As above mentioned the carbureted carbon monoxide hydrogen gas discharging from the carbureter flows through the oil gasifier 44, and supplies the latent heat required to gasify the oil in the gasifier, the oil gas heated to sufficiently high temperature passing to the carbureter through pipe 48, where it is injected into the hot carbon monoxide hydrogen gas, the mixed gas being at such a temperature that by the time the gas flows into outlet 42 a carbureted gas has been produced having the correct temperature within a temperature range of 1150° F. to 1650° F. to yield the maximum fixed hydrocarbon gas from oil gas. Generating apparatus shown by Fig. 1 can well be employed for this purpose likewise the apparatus shown by Fig. 2.

It will be appreciated from all of the foregoing that I have produced carbureted carbon monoxide hydrogen gas without the usual complicated superheating chamber operation employed in carbureted water gas operations and have also eliminated fouling of the carbureter with ungasified residue of the oil. In the use of low grade fuel oil (such as bunker C fuel oil) for carbureting any solid residue from the oil in the gasifying chamber 44 drops into a coke well in the bottom of the fuel oil gasifier 44 from which it can be removed from time to time.

It will be appreciated furthermore that I have provided a process and apparatus for the continuous flow production of carbureted carbon monoxide hydrogen gas from oil (as low grade as the ordinary bunker C grade fuel oil) which fuel oil is more generally available and is much lower in cost than the gas oil generally used for enrichment of water gas, generating a gas of almost any commercially desired heating value up to approximately 1000 B. t. u. per cubic foot.

What I claim is:—

1. A continuous process for the continuous flow enrichment or carbureting of carbon monoxide hydrogen gas which process comprises adding the enrichment material to the stream of hot flowing carbon monoxide hydrogen gas and effecting a counterflow of the mixture of enrichment material and carbon monoxide hydrogen gas with respect to the hotter stream of carbon monoxide hydrogen gas to effect heat transfer from the relatively leaner and hotter carbon monoxide hydrogen gas to the mixture of carbon monoxide hydrogen gas and enrichment material the sensible heat from the leaner gas supplying heat to convert the enrichment material into fixed gas.

2. A continuous process for the continuous flow enrichment or carbureting of carbon monoxide hydrogen gas which process comprises continuously adding hydrocarbons enrichment material to a continuously flowing stream of hot carbon monoxide hydrogen gas, and counterflowing the mixture of carbon monoxide hydrogen gas and enrichment material thus produced with respect to the hotter stream of carbon monoxide hydrogen gas to effect a heat transfer from the hot carbon monoxide hydrogen gas to the mixture of carbon monoxide hydrogen gas and hydrocarbon enrichment material the sensible heat from the leaner gas supplying heat necessary to convert the major portion of the hydrocarbons enrichment into fixed gas.

3. A continuous process for the continuous flow enrichment or carbureting of carbon monoxide hydrogen gas which process comprises continuously injecting hydrocarbons enrichment material into a continuously flowing stream of hot carbon monoxide hydrogen gas as the same is being generated and counterflowing the mixture of gas and enrichment material in proximity to the hotter carbon monoxide hydrogen gas to effect a transfer of heat from the hotter carbon monoxide hydrogen gas to the said mixture the sensible heat from the leaner gas supplying heat to convert the major portion of the hydrocarbons enrichment into fixed gas.

4. A continuous process for the continuous flow enrichment or carbureting of carbon monoxide hydrogen gas, which process comprises continuously injecting the hot hydrocarbons into a continuously flowing stream of hot carbon monoxide hydrogen gas and counterflowing the mixture of carbon monoxide hydrogen gas and hot hydrocarbons in proximity to the hotter carbon monoxide hydrogen gas to effect a heat transfer from the hotter carbon monoxide hydrogen gas to the said mixture, the sensible heat from the leaner gas supplying heat to convert the major portion of the hydrocarbons enrichment into fixed gas.

5. The process which comprises the continuous introduction of hydrocarbons enrichment material into a continuous flowing stream of hotter carbon monoxide hydrogen gas just generated, the hydrocarbons enrichment material being heated by heat recuperated from previously carbureted carbon monoxide hydrogen gas passing from the generating apparatus, and counterflowing the mixture of carbon monoxide hydrogen gas and hot hydrocarbons enrichment material with respect to the hotter leaner carbon monoxide hydrogen gas to effect a heat transfer from the hotter leaner carbon monoxide hydrogen gas to the mixture of carbon monoxide hydrogen gas and hydrocarbons enrichment to supply the additional heat necessary for the conversion of the major portion of the hydrocarbons enrichment into fixed gas enrichment.

THEODORE NAGEL.